United States Patent [19]
Arzoumanidis et al.

[11] Patent Number: 4,657,883
[45] Date of Patent: Apr. 14, 1987

[54] ESTER-MODIFIED OLEFIN POLYMERIZATION CATALYST

[75] Inventors: Gregory G. Arzoumanidis, Naperville; Sam S. Lee, Hoffman Estates; Thomas E. Wolff, Elmhurst; Linda Ornellas, Woodridge, all of Ill.

[73] Assignee: Amoco Corporation, Chicago, Ill.

[21] Appl. No.: 784,934

[22] Filed: Oct. 7, 1985

[51] Int. Cl.$^4$ ............................................. C08F 4/64
[52] U.S. Cl. ................................... 502/127; 502/108; 502/113; 526/114; 526/128; 526/142
[58] Field of Search ......................... 502/108, 113, 127

[56] References Cited
U.S. PATENT DOCUMENTS

| | | | |
|---|---|---|---|
| 4,295,991 | 10/1981 | Wristers | 502/127 X |
| 4,309,521 | 1/1982 | Sato et al. | 502/127 X |
| 4,324,693 | 4/1982 | Arzoumanidis et al. | 502/108 |
| 4,431,569 | 2/1984 | Wristers | 502/127 X |
| 4,478,951 | 10/1984 | Huff | 502/127 X |
| 4,533,705 | 8/1985 | Sato et al. | 502/127 X |

Primary Examiner—Patrick P. Garvin
Attorney, Agent, or Firm—Wallace L. Oliver; William H. Magidson; Ralph C. Medhurst

[57] ABSTRACT

An olefin polymerization catalyst component comprises an organoaluminum-reduced titanium trihalide on which a pretreatment amount of olefin polymer has been placed complexed with an alkyl aliphatic carboxylic acid ester containing 7 to 22 carbon atoms having a structure:

$$R-CO_2R'$$

wherein R' is an alkyl group containing 3 to about 8 carbon atoms and R is an alkyl group containing 3 to 17 carbon atoms, and treated with a Lewis acid, a chlorocarbon or an haloalkylchlorosilane.

20 Claims, No Drawings include butyl hexanoate, isobutyl hexanoate, butyl isovalerate, butyl iso-hexanoate, butyl caprate, butyl octanoate, isoamyl hexanoate, isoamyl caprate, isobutyl hexanoate, isobutyl caprate, propyl iso-valerate or propyl hexanoate, and mixtures thereof. More preferred esters include butyl hexanoate, isobutyl hexanoate, butyl isovalerate, butyl iso-hexanoate, isoamyl hexanoate, isobutyl hexanoate, and mixtures thereof. Butyl hexanoate is the most preferred ester useful in this invention.

The first step in preparing the titanium-containing catalyst component of this invention is reducing titanium tetrahalide, preferably titanium tetrachloride and typically dissolved in an inert hydrocarbon diluent, with an organoaluminum compound at a temperature of about −50° C. to about 30° C., preferably about −30° C. to about 0° C. The resulting slurry may be heated to about 50° to 100° C. for a period of up to a few hours.

Organoaluminum compounds useful as reducing agents include alkylaluminum compounds with a general formula $R_nAlX_{3-n}$ wherein R is an alkyl group having 1 to about 10 carbon atoms, X is a halogen, preferably chloride and n is greater than 0 and less than or equal to 3. Examples of suitable alkyl aluminum compounds are trialkylaluminum, dialkylaluminum halide, alkylaluminum dihalides, alkylaluminum sesquihalides and mixtures thereof. Preferable reducing compounds are diethyl aluminum chloride and ethyl aluminum sesquichloride.

Diluents useful in the titanium tetrachloride reduction include organic liquids substantially inert under the conditions used and include alkanes such as pentane, hexane, cyclohexane and the like.

Typically, the organoaluminum reducing agent in a hydrocarbon diluent is added, usually dropwise, to a cold solution of titanium tetrachloride in a suitable diluent with agitation. The resulting slurry preferably is heated to about 50°–100° C. for a few hours. The molar ratio of organoaluminum compound to titanium tetrachloride can vary from about 0.5 to 1 to over 2 to 1 and preferably is about 0.75 to 1 to about 1.5 to 1.

Adequate agitation is necessary to form catalyst particles with the desired particle size distribution. Proper agitation can depend on speed of an impeller, reactor configuration and point of addition of reactants.

The resulting solid contains titanium trichloride in the beta crystalline form according to the generally adopted classification (Journal of Polymer Chemistry, 51, 1961, pp. 399–410). Such titanium trichloride-organoaluminum complex preferably can be contacted with a polymerizable alpha-olefin under polymerization conditions either with or without separating and washing the solid material. If separated suitable amounts of alkyl aluminum cocatalyst may be added during this prepolymerization procedure. Alpha-olefins useful in the prepolymerization (pretreatment) procedure can contain from 2 to about 10 carbon atoms, preferably 3 to about 8 carbon atoms, and most preferably is propylene. Other suitable alpha-olefins include butene-1, pentene-1, hexene-1, heptene-1, 4-methyl-pentene-1. Typically suitable alpha-olefins contain no branching on the vinylic carbon atom. The temperature for the prepolymerization procedure can range from about 0° C. to about 100° C. and preferably is about 35° C. to about 65° C. The pretreatment amount of polymerized alpha-olefin contain on the titanium trihalide compound can range from about 1 to about 1000 wt. %, preferably about 3 to about 100 wt. % and most preferably about 6 to about 30 wt. % based on the weight of titanium trihalide complex. Typically, after the prepolymerization procedure is completed, the resulting product is separated and washed with a hydrocarbon solvent. The prepolymerized titanium halide complex is considered encapsulated with a coating of polymer.

Generally, the ester complexing agent of this invention is added to a hydrocarbon slurry of prepolymerized titanium halide product at ambient temperature to about 100° C. Subsequent to or in conjunction with treatment with such ester, the prepolymerized product is reacted further with a Lewis acid (electron pair acceptor) compound such as titanium tetrachloride. Other Lewis acid compounds include Groups IVB, IVA, and VA halides and oxyhalides. The molar ratio of Lewis acid to prepolymerized titanium halide can range from about 10:1 to 0.5:1 and preferably from about 3:1 to about 1:1.

After the reduced catalyst component is reacted with a Lewis acid, such as titanium tetrachloride, the component then is treated further with additional ester of this invention. The molar ratio of additional ester to reduced titanium compound can range from about 1:1 to about 1:20 and typically is about 1:2 to about 1:5.

An important consideration in preparing superior titanium-containing catalyst component is control of the morphology of the catalyst particles. Catalysts of this invention should have a substantially spherical shape and have average particle sizes between about 20 and about 45 microns. By "average particle size" it is meant that 90% of all particles have diameters within 15% of such average size. This average is determined from photomicrographs of catalyst particles using well-established statistical techniques. A preferable catalyst has an average particle size between about 25 and about 40 microns and most preferably between about 30 and 35 microns. A good morphology of catalyst particles is necessary for a good morphology of resulting polymer particles. Thus very small particles (fines) and agglomerated particles should be avoided. Generally, particle size can be controlled by the extent of agitation used; increased agitation produces smaller particles.

In place of Lewis acids, other reactants include chlorinated hydrocarbon compounds such as hexachloroethane, pentachloroethane, trichloropentane, tetrachloroethane and the like. Typically, such chlorinated hydrocarbons contain 2 to about 8 carbon atoms and 2 to about 6 chlorine atoms per molecule.

The molar ratio of ester complexing agent of this invention to titanium compound in the titanium-containing catalyst component of this invention can range from about 0.1 to about 2.5, preferably about 0.2 to about 1.2 and most preferably about 0.3 to about 0.9.

The chemically activated, optionally pretreated, titanium halide catalyst component described in this invention is used in conjunction with an organoaluminum chloride compound as a catalyst system to polymerize alpha-olefins, such as propylene, butene-1 and 4-methylpentene-1. This catalyst system is most useful to polymerize propylene or a mixture of propylene and a minor amount of ethylene or other copolymerizable alphaolefins to a polymer containing a substantial crystalline content.

Alternatively, catalyst components of this invention can be prepared by activating an organoaluminum titanium halide with an ester of this invention combined with a haloalkylchlorosilane compound.

In this embodiment, generally the ester complexing agent of this invention is added to a hydrocarbon slurry

ESTER-MODIFIED OLEFIN POLYMERIZATION CATALYST

BACKGROUND OF THE INVENTION

This invention relates to olefin polymerization catalysts and more particularly relates to unsupported titanium halide based, ester-modified catalysts useful for polymerization of olefins such as propylene.

Olefin polymerization catalysts based on transition metal compounds and aluminum alkyls are well known in the art. The use of titanium trihalide compounds as a polymerization catalyst component to produce crystalline alphaolefin polymers has been reported widely. One group of titanium trihalide based catalyst components generally are referred to as "unsupported" catalysts. Typically, these are produced by reducing a titanium tetrahalide, such as titanium tetrachloride, with an agent such as an aluminum alkyl and forming a complex with the resulting titanium trihalide with an electron donor compound together with treatment by a Lewis acid, such as titanium tetrahalide. A widely-published unsupported catalyst system is based on a complex of titanium trihalide with an ether, thioether or thiol.

U.S. Pat. No. 4,210,738 describes a titanium halide-based catalyst in the delta crystalline form having a color tending toward violet made by reducing titanium tetrachloride with an aluminum alkyl, treating the reduced solid with an ether, thioether or thiol complexing agent and reacting with additional titanium tetrachloride.

U.S. Pat. No. 4,305,920 describes a titanium trihalide catalyst complex containing an ether which is precipitated in the presence of an ester having at least 11 carbon atoms.

U.S. Pat. No. 3,984,350 describes a highly catalytically active titanium trihalide composition in the beta crystalline form having a brown color formed by reducing titanium tetrachloride with an aluminum alkyl and reacting, under controlled conditions, the resulting reduced product with a complexing agent such as an ether and additional titanium tetrachloride.

U.S. Pat. No. 4,295,991 describes a method to treat an unsupported catalyst with olefin monomer such that the resulting catalyst particle is non-friable.

U.S. Pat. No. 4,400,494 describes use of an unsupported catalyst with an aluminum alkyl halide compound containing a specific halogen/aluminum atomic ratio.

U.S. Pat. No. 4,324,693 describes an unsupported catalyst in which the molar ratio of complexing agent to titanium compound is greater than 1.15.

U.S. Pat. No. 4,422,956 describes activation of a complexed reduced titanium halide composition with a Lewis base complexing agent and a haloalkylchlorosilane.

U.S. Pat. No. 4,190,550 describes reduction of titanium tetrachloride by aluminum metal in benzene in the presence of aluminum chloride. The resulting liquid phase is treated with butyl acetate and a solid is precipitated by addition of heptane which is activated with titanium tetrachloride.

Other patents relating to ether-complexed, reduced titanium trihalide catalysts include U.S. Pat. Nos. 4,039,521, 4,240,928, 4,251,388 and 4,315,090.

Although some references generally teach Lewis base complexing agents, which would include compounds other than ethers, thioethers or thiols, the art also teaches that Lewis bases such as esters do not form a very active polymerization catalyst in comparison to an ether-complexed catalyst component. For example, in the prosecution history of U.S. Pat. No. 4,210,738, the applicant withdrew a paragraph suggesting that esters are suitable complexing agents based on experimental findings that esters such as ethyl acetate were inoperative.

Applicants have found, contrary to indications in the art, that highly active olefin polymerization catalyst components can be formed from aluminum alkyl-reduced titanium halides complexed with a special class of ester compounds.

SUMMARY OF THE INVENTION

An olefin polymerization catalyst component comprises an organoaluminum-reduced titanium trihalide on which a pretreatment amount of olefin polymer has been placed complexed with an alkyl aliphatic carboxylic acid ester containing 7 to 22 carbon atoms having a structure:

wherein R' is an alkyl group containing 3 to about 8 carbon atoms and R is an alkyl group containing 3 to 17 carbon atoms, and treated with a Lewis acid, a chlorocarbon or an haloalkylchlorosilane.

BRIEF DESCRIPTION OF THE INVENTION

The olefin polymerization catalyst system of this invention comprises an aluminum alkyl-reduced titanium-containing component complexed with a class of alkyl aliphatic carboxylic acid.

Esters useful in this invention are alkyl aliphatic carboxylic acid esters containing a total of 7 to about 22 carbon atoms and preferably 10 to 14 carbon atoms. In such esters, the alkyl groups may be derived from an alcohol containing from 3 to 8 carbon atoms and preferably 4 to 6 carbon atoms. Esters of n-butyl, isobutyl and iso-amyl alcohol are preferred and butyl most preferred. The aliphatic carboxylic acid from which the esters of this invention may be derived contain 4 to 18 carbon atoms, preferably 4 to 10 and most preferably 5 or 6 carbon atoms and typically are linear. Esters of hexanoic, iso-hexanoic, valeric and iso-valeric acids are preferred.

Usually, alkyl aliphatic carboxylic acid esters are considered to be derived from an alkyl alcohol and an aliphatic carboxylic acid, although esters useful in this invention can be manufactured in any suitable manner. Alternatively, suitable esters can be represented as:

where R' is an alkyl group containing 3 to about 8 carbon atoms, preferably 4 to 6 carbon atoms, and R is an alkyl group containing 3 to 17 carbon atoms, preferably 3 to 9 and most preferably 4 or 5 carbon atoms.

Examples of esters useful in this invention include butyl butyrate, butyl isobutyrate, butyl isovalerate, butyl hexanoate, butyl octanoate, butyl pelargonate, butyl caprate, butyl isohexanoate, butyl laurate, butyl olcate, butyl stearate, isobutyl isovalerate, isobutyl hexanoate, isobutyl octanoate, isoamyl caprate, isoamyl hexanoate, isobutyl pelargonate, isobutyl butyrate, isobutyl caprate, propyl butyrate, propyl isovalerate, propyl hexanoate and propyl octanoate. Preferred esters of prepolymerized titanium halide product at ambient temperature to about 100° C. Subsequent to or in conjunction with treatment with Lewis base, the product is activated further with a suitable haloalkylchlorosilane compound. The molar ratio of chlorosilane compound to titanium halide can range from about 10:1 to 0.5:1 and preferably from about 2:1 to about 0.7:1. Preferably, activation with haloalkylchlorosilane is carried out for 2 to 10 hours at 60° to 95° C. and preferably 85° to 90° C.

Haloalkylchlorosilanes useful in this invention include compounds with the formula:

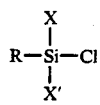

wherein R is a haloalkyl radical containing one to about ten carbon atoms or a halosilyl radical or haloalkylsilyl radical containing one to about eight carbon atoms, and X and X' are halogen, hydrogen, or alkyl or haloalkyl radicals containing one to about ten carbon atoms. Typically, R is a chloroalkyl radical containing one to about eight carbon atoms and one to about twelve chlorine atoms, and X is chlorine or a chloroalkyl radical containing one to four carbon atoms, and X' is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

After the reduced catalyst component is reacted with an haloalkylchlorosilane compound, the component then can be treated further with additional ester or mixed esters of this invention. The molar ratio of additional ester to reduced titanium compound can range from about 1:1 to about 1:20 and typically is about 1:2 to about 1:5.

The molar ratio of chemically activated pretreated titanium halide to organoaluminum compound in a catalyst system can range from about one-tenth to about 10, typically is about 1 to 6. The amount of catalyst in a polymerization depends on the reactor size and type and on the amount and type of olefin monomer and is known to the skilled artisan.

Catalyst additives such as disclosed in U.S. Pat. Nos. 3,950,268 and 4,072,809, incorporated herein by reference, can be added in minor amounts. Examples of catalyst modifiers include alkyl silicates, orthosilicate esters, esters, Lewis bases such as sulfides, phosphines, phosphites, phosphates, phosphine oxides, aromatic amines, amine oxides, tertiary aliphatic amines and ethers or an organometallic chalcogenide such as bis(-trialkyl)tin sulfide. These additional additives can be present in minor amounts ranging from about one-tenth to 30 mol percent and preferably about 1 to 20 mol percent of the transition metal halide in the catalyst system.

Since the catalyst systems used in this invention are sensitive to oxygen and moisture, suitable precautions should be taken during catalyst preparation, transfer and use.

The catalyst system described in this invention can be used to polymerize alpha-olefins dissolved or suspended in liquid paraffinic medium, dissolved in liquid monomer, or in the gas phase.

Polymerization processes employing this invention can be practiced at pressures ranging from about atmospheric to about 20,000 psig and preferably from about 30 to 1000 psig.

Polymerization time depends on the process used. In batch processes the polymerization contact time usually is about one-half to several hours and in autoclave processes typically is one to four hours. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane soluble or extractable products. Preferably, the temperature ranges from about 2° C. to about 95° C. and most preferably from about 50° C. to about 80° C.

Gas-phase reactor systems include both stirred bed reactors and fluidized bed reactor systems. Examples of such reactor systems are described in U.S. Pat. Nos. 3,957,448; 3,965,083; 3,971,768; 3,970,611; 4,129,701; 4,101,289; 3,652,527; and 4,003,712 all incorporated by reference herein. Typical gas-phase olefin polymerization reactor systems comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh fed monomer are mixed and injected into the reactor vessel. A quench liquid, examples of which are lower alkanes or liquid monomer such as propylene, can be added to polymerizing olefin in order to control temperature.

This invention is useful in polymerizing propylene to a normally solid, substantially crystalline polymer, although propylene also can be polymerized with minor amounts up to about 30 wt. % of ethylene or other copolymerizable alpha-olefins containing up to 10 carbon atoms to form random, pure-block, terminal block and multisegment copolymers.

The normally-solid propylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

The invention is demonstrated but not limited by the following examples.

EXAMPLE 1

A titanium-containing catalyst component was prepared by first reducing 105 grams (0.5535 mole) of titanium tetrachloride in 168 grams of n-hexane cooled to −7° C. in a vigorously stirred one-liter nitrogen-purged autoclave reactor with 71 grams (0.5879 mole) of diethyl aluminum chloride in 213 grams of n-hexane added dropwise over four hours. The temperature was maintained at −7° C. for an additional 15 minutes, raised to 65° C. within one hour, maintained at 65° C. for two hours. After cooling slightly, the reactor was vented to 1 psig, 24 grams of propylene were admitted slowly. After about 45 minutes, the reactor was vented and flushed several times with nitrogen. The resulting solid product was washed seven times with 225-milliliter portions of n-hexane. The average particle size of such product was 23±4 microns. The supernatant liquid from the last wash was decanted and 400 grams of n-hexane were added to the reactor.

In a second step, 82 milliliters of butyl hexanoate (BH) were added dropwise within one hour at room temperature to the stirred reactor containing the above-prepared organoaluminum reduced titanium chloride. The temperature then was increased gradually to 71° C. within one hour and maintained at 71° C. for 1.5 hours, after which time 300 milliliters of hexane were added, the agitation stopped. After suspended solids were allowed to settle, supernatant liquid was decanted.

In a third step, 85 milliliters of hexane were added to the above-produced solids and agitation resumed followed by dropwise addition of 110 grams of titanium tetrachloride within ½ hour while heating the resulting mixture at 71° C. for three hours, the resulting solid product was washed seven times with about 200 milliliter portions of hexane. The average particle size of the product was 27±4 microns.

Polymerization Tests

A propylene polymerization test was performed using bulk polymerization techniques. A catalyst slurry was prepared in hexane containing diethylaluminum chloride (DEAC), titanium trichloride catalyst component, bis(tributyl)tin sulfide [BTS] and collidine. The DEAC TiCl$_3$:BTS:collidine molar ratio was about 7/1/0.03/0.03. In an oxygen-free, two-liter stirred Parr reactor, 1,000 milliliters of propylene were added followed by addition of 1.2 milliliters of catalyst slurry containing 0.03 grams of titanium trichloride flushed with 300 milliliters of additional propylene and the reactor was pressured with 15 psig of hydrogen. The mixture was allowed to polymerize for two hours at 71° C. under vigorous agitation at 450 R.P.M. The resulting product was dried and analyzed by X-ray fluorescence (XRF) for titanium and aluminum content. Results of the polymerization test using the titanium-containing catalyst component produced in Example 1 were Yield (g/g of TiCl$_3$)=9118; Extractables (Determined by measuring loss in weight of a dry, ground polymer sample after being extracted with boiling n-hexane for six hours.)=1.4%; and Bulk Density=31.2 lbs/ft$^3$. These values compare very favorably with polymerization runs using ether-based unsupported titanium trihalide catalyst components.

EXAMPLES 2-5

Additional catalysts were prepared and tested in bulk polymerization in a manner similar to that described in Example 1. Results are shown in Table I.

Comparative Run A

A comparative catalyst was prepared in a manner similar to that described in Example 1, except ethyl acetate was used as the ester. Bulk polymerization using this catalyst yielded a small amount of polymer with a bulk density of 19.2 having high extractables.

TABLE I

| Example (Run) | Ester (1) | Yield (grams/ gram of catalyst) | Hexane Extractables (wt. %) | Bulk Density (lbs/ft$^3$) |
|---|---|---|---|---|
| 1 | BH | 9118 | 1.4 | 31.2 |
| 2 | BO | 6458 | 2.1 | 31.0 |
| 3 | BH | 7381 | 2.1 | 31.0 |
| 4 | BIV | 5904 | 5.9 | 30.8 |
| 5 | BL | 6967 | 2.7 | 30.2 |
| A | EA | — | — | 19.2 |

(1) BO = Butyl octanoate
BH = Butyl hexanoate
BIV = Butyl isovalerate
BL = Butyl laureate
EA = Ethyl acetate

EXAMPLES 6-13

Additional catalysts were prepared in a manner described in Example 1 and were tested in batch gas-phase polymerization.

A series of batch gas phase propylene polymerizations were performed in a 2.5-liter reactor at 160° C. at 300 psig including 36 mmole of hydrogen with stirring at at 40 rpm with a residence time of 2.5 hours. Diethylaluminum chloride (DEAC) was used as a co-catalyst together with hydrogen sulfide and electron donor (ED) modifiers. The reactor was charged with DEAC/modifiers, titanium component, hydrogen and propylene in that order. Products were analyzed as described in Example 1. Results are shown in Table II.

TABLE II

Gas-Phase Polymerization Performance

| Example | Al/Ti/H$_2$S/(ED)[1] (molar ratio) | Yield (g/g) | Extractables (wt. %) | Bulk Density (lbs/ft$^3$) |
|---|---|---|---|---|
| 6 | 3.5/1/.018/— | 7900 | 8.3 | 27.5 |
| 7 | 3.0/1/.030/— | 8300 | 5.8 | 28.1 |
| 8 | 3.6/1/.34/.034(TBP) | 8200 | 3.5 | 28.7 |
| 9 | 5.2/1/.05/.05(EB) | 9100 | 3.4 | 25.6 |
| 10 | 4.7/1/.04/.04(EB) | 8200 | 3.4 | 26.8 |
| 11 | 4.2/1/.04/.04(MpT) | 8300 | 3.6 | 26.8 |
| 12 | 4.5/1/.04/.04(MA) | 7900 | 3.2 | 28.1 |
| 13 | 4.8/1/.05/.05(EA) | 7800 | 3.2 | 28.1 |

[1](ED):
TBP = Tributylphosphite
EB = Ethyl benzoate
MpT = Methyl-p-toluate
MA = Methyl anisate
EA = Ethyl anisate

EXAMPLE 14

A prepolymerized reduced titanium trichloride mixture was prepared as described in Example 1 except the scale was three times larger. Aliquots of the so-prepared reduced solid (35 grams; 0.147 gram-atoms Ti) in 150 milliliters of hexane was treated at about ambient temperature with 23 milliliters of dichloromethyl trichlorosilane (CHCl$_2$SiCl$_3$) followed by addition of 23 milliliters of n-butyl caprate (99% pure). The resulting agitated suspension was heated to 71° C. within one-half hour, held at 71° C. for one hour, then increased within ¼ hour to 88° C. and maintained at the higher temperature for 3.3 hours, during which time the suspended solids turned purple.

A two-hour polymerization test run at 71° C. using the prepared titanium-containing catalyst component was used in a bulk phase propylene polymerization test as described in Example 1. The yield was 6700-7200 gram of polymer per gram of TiCl$_3$ and the Extractables were 3.9 wt. %. The morphology of the catalyst and polymer was considered excellent.

EXAMPLE 15

A titanium-containing catalyst component was prepared by first placing 0.44 mol titanium tetrachloride and 150 milliliters of dry hexane into a dry, nitrogen filled 800 milliliter glass reactor which was jacketed for temperature control by a Lauda circulating bath. To this mixture which was maintained at −7° C. and stirred at 450 rpm were added dropwise 384 milliliters of a 20 wt. % solution of diethylaluminum chloride in hexane over four hours after which time the temperature was maintained for 20 minutes. The reactor temperature then was increased over about one hour to 70° C. and maintained at that temperature for two hours. The resulting product was treated with propylene at 60° C. by addition of 57 milliliters of liquid propylene with stirring over ½ hour. The resulting product was washed 7 times with 260 milliliter aliquots of warm (about 50° C.) hexane. The polypropylene content was 6.3 wt. %. A portion of the reduced titanium halide solid prepared above containing about 0.11 mol TiCl$_3$ was added to a clean, dry nitrogenfilled 800 milliliter reactor and hexane added to the 80 milliliter level. After the reactor is heated to 60° C., 0.033 mol butyl caprate (99% pure by gas chromatography) and 0.22 mol 1,1,2,2-tetrachloroethane (TCE) were deoxygenated and added to the reactor. The resulting mixture is heated at 85° C. for 6 hours after which a brown solid remained. Another 0.11 mol of tetrachloroethane and 0.005 mol pentachloroethane (PCE) were added to the reaction mixture and heated for 6 hours at 85° C. The solid remained brown until another 0.016 mol of butyl caprate was added to the reactor at 60° C. whereupon within five minutes the solid turned purple. The mixture was maintained at 73° to 78° C. for 1.5 hours after which time the solid was washed seven times with 170-milliliter aliquots of warm hexane. The final polypropylene content was 30.5 wt. %. The solid catalyst component comprised purple, slightly elongated spheres with a narrow particle size distribution and an average diameter of 24 microns.

Comparative Run B

Comparative component B was prepared using procedures similar to that described in Example 15. Butyl-ptoluate was used as the ester and Tetrachloroethane was the only chlorocarbon used.

Portions of catalyst components prepared in Example 15 of the specification and Comparative Example B were used in a bulk phase propylene polymerization test described in Example 1 with co-catalyst components in a molar ratio of DEAC/Ti/BTS/Collidine=7/1/0.07/0.07 for Example 15 and 8/1/0.04/0.04 for Run B. For the catalyst of Example 15 the yield was 6970 grams of polymer per gram of TiCl$_3$ and extractables of 2.1 wt. %. For the catalyst of Comparative Run B the yield was 220 grams of polymer per gram of catalyst. Because of the low yield, other analyses on this product were not run.

EXAMPLE 16-25

Additional catalyst samples were prepared in a manner similar to that described in Example 15 using various esters and tested in bulk polymerization conditions as described in Example 1. with co-catalyst components in a molar ratio of DEAC/Ti/BTS/Collidine=8/1/0.04/0.04. Various ratios of chlorocarbons and esters were used in catalyst preparation. Results are shown in Table III.

TABLE III

| | Bulk Polymerization Performance | | | |
|---|---|---|---|---|
| Example (Run) | Catalyst Preparation Reagent Molar Ratios Ti/Ester[1]/TCE/PCE | Yield (g/g) | Extractables (wt. %) | Bulk Density (lbs/ft$^3$) |
| 15 | 1/0.45(BH)/3/0.05 | 6970 | 2.1 | 28.7 |
| 16 | 1/0.4(BH)/1/0.5 | 8160 | 4.5 | 27.8 |
| 17 | 1/0.4(IAH)/1/0.5 | 5740 | 8.7 | 27.5 |
| 18 | 1/0.45(IBH)/1/0.7 | 6890 | 6.1 | 27.7 |
| 19 | 1/0.35(BC)/1/0.9 | 9390 | 1.8 | 29.7 |
| 20 | 1/0.35(BH)/1/0.7 | 10200 | 1.8 | 30.9 |
| 21 | 1/0.35(BC)/1/0.5 | 7560 | 5.8 | 30.6 |
| 22 | 1/0.35(IBC)/1/0.5 | 8610 | 4.9 | 30.1 |
| 23 | 1/0.35(BO)/1/0.7 | 9540 | 3.4 | 29.5 |
| 24 | 1/0.35(BIH)/1/0.7 | 9840 | 2.8 | 30.0 |
| 25 | 1/0.35(IAC)/1/0.5 | 7560 | 1.0 | 31.6 |
| (B) | 1/0.35(BpT)/1/0.7 | — | — | — |

[1]Ester:
BH = Butyl hexanoate
BC = Butyl caprate
BO = Butyl octanoate
BIH = Butyl iso-hexanoate
BpT = Butyl p-toluate
IAC = Isoamyl caprate
IAH = Isoamyl hexanoate
IBH = Isobutyl hexanoate
IBC = Isobutyl caprate

What is claimed is:

1. An olefin polymerization catalyst component comprising an organoaluminum-reduced titanium trihalide, on which a pretreatment amount of olefin polymer has been placed, complexed with an alkyl aliphatic carboxylic acid ester containing 7; to 22 carbon atoms having a structure:

$$R-CO_2R'$$

wherein R' is an alkyl group containing 3 to about 8 carbon atoms and R is an alkyl group containing 3 to 17 carbon atoms, and treated with a Lewis acid, a chlorocarbon or an haloalkylchlorosilane.

2. The catalyst component of claim 1 wherein R contains 3 to 9 carbon atoms and R' contains 4 to 6 carbon atoms.

3. The catalyst component of claim 1 wherein the ester butyl hexanoate, isobutyl hexanoate, butyl iso-valerate, butyl iso-hexanoate, butyl caprate, butyl octanoate, isoamyl hexanoate, isoamyl caprate, isobutyl hexanoate, isobutyl caprate, propyl iso-valerate or propyl hexanoate, and mixtures thereof.

4. The catalyst component of claim 1 wherein R contains 4 or 5 carbon atoms and R' contains 4 to 6 carbon atoms.

5. The catalyst component of claim 4 wherein the ester butyl hexanoate, isobutyl hexanoate, butyl iso-valerate, butyl iso-hexanoate, isoamyl hexanoate, isobutyl hexanoate, and mixtures thereof.

6. The catalyst component of claim 1 wherein the ester is butyl hexanoate.

7. The catalyst component of claim 1 wherein the Lewis acid is titanium tetrachloride.

8. The catalyst component of claim 1 which is treated with a haloalkylchlorosilane.

9. The catalyst component of claim 1 which is treated with a chlorocarbon.

10. The catalyst component of claim 1 wherein about 1 to 1000 wt. %, polypropylene has been placed onto the reduced titanium halide.

11. The catalyst component of claim 1 which is further treated with an alkyl aliphatic ester containing 7 to 22 carbon atoms.

12. An olefin polymerization catalyst component comprising an organoaluminum reduced titanium trichloride, on which a pretreatment amount of about 1 to 1000 wt. % polypropylene has been placed, complexed with an alkyl aliphatic carboxylic acid ester containing 10 to 14 carbon atoms having a structure:

$$R-CO_2R'$$

wherein R' is an alkyl group containing 4 to about 6 carbon atoms and R is an alkyl group containing 3 to 9 carbon atoms, and treated with titanium tetrachloride, a haloalkylchlorosilane or a chlorocarbon.

13. The catalyst component of claim 12 wherein R contains 4 or 5 carbon atoms and R' contains 4 to 6 carbon atoms.

14. The catalyst component of claim 13 wherein the alkyl aliphatic carboxylic acid ester is butyl hexanoate.

15. The catalyst component of claim 13 wherein the complex is treated with titanium tetrachloride.

16. The catalyst component of claim 14 wherein the complex is treated with titanium tetrachloride.

17. The catalyst component of claim 12 wherein the complex is treated with 1,1,2,2-tetrachloroethane, pentachloroethane or a mixture thereof.

18. The catalyst component of claim 13 wherein the complex is treated with 1,1,2,2-tetrachloroethane, pentachloroethane or a mixture thereof.

19. The catalyst component of claim 13 wherein the complex is treated with a haloalkylchlorosilane.

20. The catalyst component of claim 12 on which about 3 to about 100 wt % pretreatment polymer has been placed.

* * * * *